United States Patent [19]

Giannuzzi

[11] Patent Number: 5,188,496
[45] Date of Patent: Feb. 23, 1993

[54] SELF-TAPPING SCREW-TYPE MASONRY ANCHOR

[76] Inventor: Louis N. Giannuzzi, 59 Dingletown Rd., Greenwich, Conn. 06830

[21] Appl. No.: 912,478

[22] Filed: Jul. 13, 1992

[51] Int. Cl.$^5$ .................. F16B 25/00; F16B 39/30
[52] U.S. Cl. ................... 411/386; 411/310; 411/411; 411/426
[58] Field of Search ............ 411/307, 308, 386, 387, 411/411, 422, 424, 426, 418, 309, 310

[56] References Cited

U.S. PATENT DOCUMENTS

| | | | |
|---|---|---|---|
| 3,351,115 | 11/1967 | Boehlow | 411/308 X |
| 3,937,119 | 2/1976 | Ernst | 411/422 |
| 4,439,077 | 3/1984 | Godsted | 411/411 |
| 4,842,467 | 6/1989 | Armstrong | 411/386 |
| 5,044,853 | 9/1991 | Dicke | 411/386 |

FOREIGN PATENT DOCUMENTS 2815247 10/1979 Fed. Rep. of Germany ...... 411/386

*Primary Examiner*—Neill R. Wilson
*Attorney, Agent, or Firm*—Michael Ebert

[57] ABSTRACT

A self-tapping screw-type masonry anchor which when turned into a hole drilled in a masonry structure to secure an object thereto is then highly resistant to pull-out forces. The anchor is fabricated of a metal whose hardness is such that when it rubs against a masonry surface it is abraded and worn thereby. The anchor includes a head engageable by a torque-producing tool to rotate the anchor, and a shank extending therefrom provided with a root section surrounded by a helical male cutting thread whose series of convolutions have sharp crests and extend from the leading to the trailing end of the root section. The crests have diameters greater than that of the hole which decrease progressively from the leading to the trailing end to create a reverse taper. When the anchor is rotated to cause it to enter the hole and tap its wall, the sharp crest at the leading end of the cutting thread experiences a high degree of wear and blunting, the degree of crest wear diminishing progressively toward the trailing end to effectively erase the taper and produce a male thread in the shank of substantially uniform diameter and a mating female internal thread in the wall of the hole, this relationship resulting in high resistance to loosening of the anchor.

10 Claims, 1 Drawing Sheet

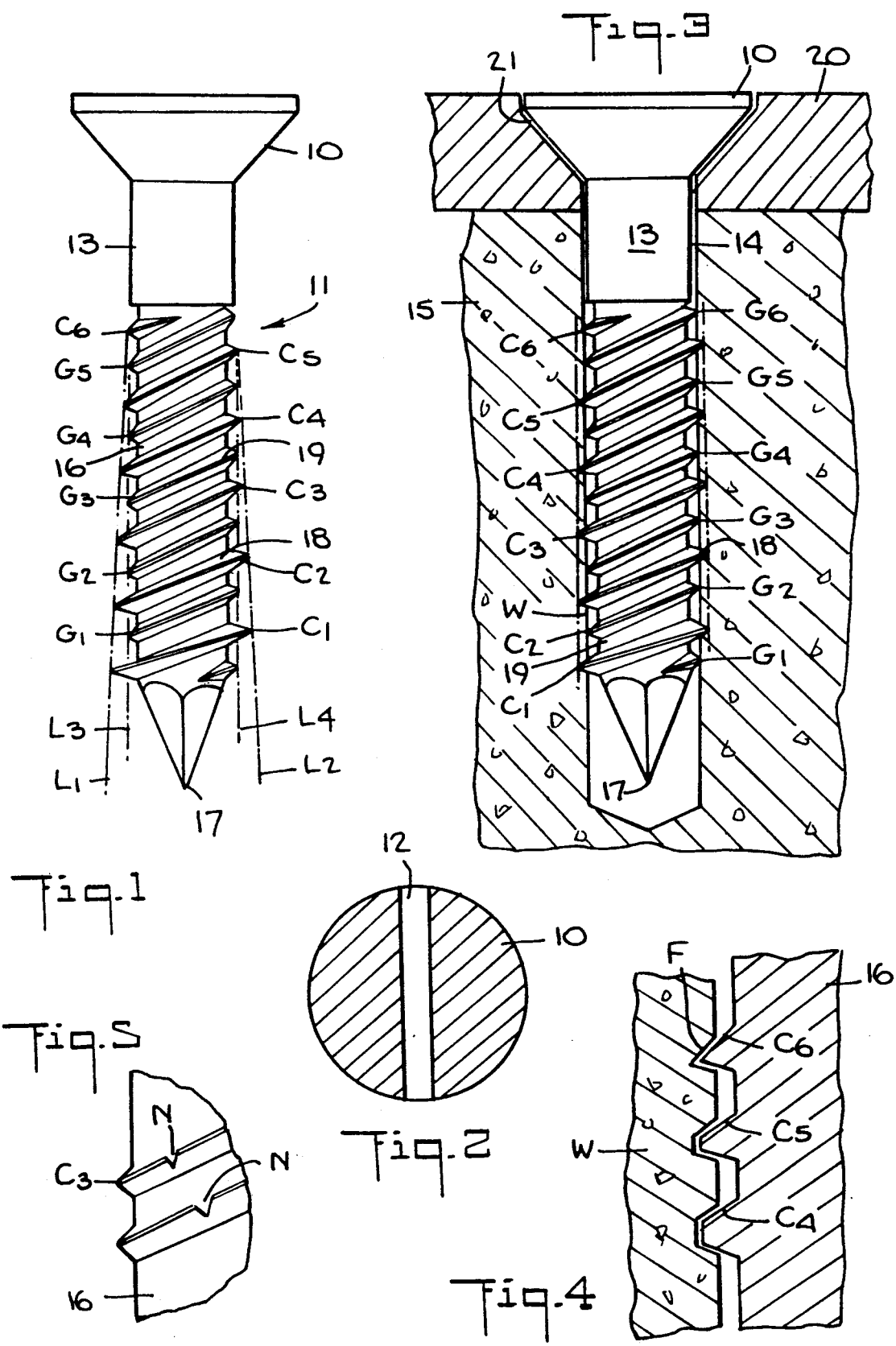

SELF-TAPPING SCREW-TYPE MASONRY ANCHOR

BACKGROUND OF THE INVENTION

1. Field of Invention:

This invention relates generally to masonry anchors, and more particularly to a self-tapping, screw-type masonry anchor which when installed in a hole bored in a masonry structure to secure a fixture or other object thereto, is then highly resistant to forces which seek to pull the anchor out of the hole.

2. Status of Prior Art:

It is frequently necessary to secure fixtures, brackets, channel pieces and other more or less heavy objects to the surface of a masonry structure formed of concrete, brickwork or other masonry material. These objects are attached to the masonry structure by masonry anchors.

Concrete is made by mixing cement and an aggregate of inert particles of varying size, such as a combination of sand or broken stone screenings with gravel. Compressive strength is generally accepted as the principal index to the structural quality of concrete. Mixtures for concrete masonry structures, such as walls and partitions, ordinarily employ aggregates having a maximum size of one half inch.

Masonry brick is usually formed from clay, shale or pumice hardened by heat. Bricks for this purpose are available in different degrees of hardness, depending on the material used in making the brick.

But regardless of the material used in forming a masonry structure, when a hole is drilled therein to receive a metal masonry anchor whose shank frictionally engages the wall of the hole drilled in the masonry, because the wall of the hole has abrasive characteristics, it will abrade and wear the shank to a degree that depends on the physical properties of the anchor metal. Thus a shank made of tungsten carbide metal which has an exceptionally high degree of Rockwell A hardness will experience little wear, whereas a shank made of stainless steel, which is not nearly as hard, is subject to much greater wear.

The patent to Ernst, U.S. Pat. No. 3,937,119 discloses a self-tapping, screw-type metal anchor which has a sharp-crested helical male thread surrounding the shank of the anchor. The convolutions of the thread running the length of the shank. This male thread, when the anchor is turned into a hole drilled in masonry, functions to tap the wall of the hole to create an internal female thread in the wall. Since the male thread on the shank mates with the female wall thread, the anchor is then resistant to pull-out forces which seek to back the anchor out of the hole.

Also included in the Ernst anchor is a second thread whose convolutions surround the shank in the successive spaces between the convolutions of the cutting thread. The crests of the second thread have a diameter which is smaller than that of the cutting thread crests and about equal to the diameter of the masonry hole. This second thread acts as a guide thread to center the anchor in the masonry hole, so that the anchor is not permitted to tilt as it is turned into the hole.

As explained in the Ernst patent, the guide thread, by preventing tilting of the anchor in the masonry hole, enhances its pull-out resistance; for if the anchor were tilted, the crests of the cutting thread would then not be properly embedded in the hole.

In a preferred form of the Ernst masonry anchor, the crests of the cutting thread are not of uniform diameter throughout the length of the shank, but decrease progressively from the trailing end of the shank toward the tip or leading end which is inserted into the mouth of the hole. Because the cutting thread is tapered, according to Ernst, it can be turned into the hole with a minimal amount of torque by a conventional threaded fastener tool, such as a screwdriver.

Another feature of the Ernst masonry anchor resides in a series of notches formed on the crests of the cutting thread along the full length of the shank. These notches, in conjunction with the tapering of the crest diameters of the cutting thread, make it possible to insert the anchor in the masonry hole without unduly disturbing the wall of the hole. Masonry material tends to crumble when worked. But with the gradual chipping carried out by the notches during continued rotation of the anchor, this serves to ensure the firm embedment in the wall of at least the relatively large diameter crests at the trailing end of the cutting thread.

According to Ernst, as aggregate particles of the masonry hole wall are gradually removed from the wall by the action of the notches, the material so removed is trapped in the spaces between the convolutions of the cutting thread. The retention of these particles in the spaces enhances the pull-out strength of the anchor.

We have found, however, that an anchor of the Ernst type actually offers low resistance to back out resulting from vibratory and other external forces transmitted to the installed anchor through the masonry structure. These forces may originate from operating machinery mounted on the masonry structure or heavy moving trucks or other vehicles traveling near the site of the masonry structure. Also, high winds are a factor when the masonry structure is exposed thereto. These forces seek to back the installed anchor out of the masonry hole.

The reason the Ernst masonry anchor, which has a tapered male cutting thread, has poor back-out resistance, is that when it is turned into a masonry hole and taps the wall of this hole, it then creates on this wall an tapered internal female thread that mates with the tapered male thread.

When a male tapered element is fully socketed within a complementary female tapered element, these elements are then contiguous. But if the male element is axially withdrawn even slightly, then the tapered male element is separated from the complementary female element.

An installed Ernst anchor having a tapered male cutting thread on the shank is then intermeshed with the tapered internal female thread in the wall of the masonry hole. But if this anchor, which serves to hold an object against the masonry surface, is subjected to vibratory forces that act to back the anchor out of the hole even to a slight degree, when this happens, the male thread disengages from the female thread. The anchor is then loose and is free to pull out of the hole, and it ceases, therefore, to hold the object against the masonry.

In the embodiment of the Ernst anchor in which the cutting thread is of uniform diameter and therefore has no taper, as this anchor is turned into a hole bored in masonry, the crests of the leading end of the shank which have to work their way almost the full depth of the hole will experience the greatest amount of wear; hence this cutting thread will have a taper imparted thereto in the course of being turned in. But in the Ernst embodiment in which the cutting thread is tapered, since the crests at the leading end of the shank have the smallest diameter and those at the trailing end the greatest diameter, the amount of wear to which these crests are subjected in the course of turning in the anchor is about the same; hence the taper will be retained. In either case, the installed anchor will have poor resistance to being backed out of the hole by vibratory forces.

Another drawback of the Ernst screw-type masonry anchor whose cutting thread has a tapered formation is that it requires a high degree of torque to drive the anchor into the masonry hole.

The reason for this is that the diameter of the cutting crests increases progressively from the leading to the trailing end of the shank. Hence as the anchor is rotated to tap its way into the masonry hole, the wall of the hole is engaged by crests of increasing diameter, this resulting in a progressive rise in drag and greater resistance to rotation.

The high torque required to turn the Ernst masonry anchor into the masonry hole may limit the depth of entry, for a point is reached where even the high torque is insufficient to overcome the resistance to turning, and further advance of the anchor into the hole is arrested. And when the anchor is so arrested, the continued application of a high torque may cause the anchor to fracture or snap in half.

SUMMARY OF INVENTION

In view of the foregoing, the main object of this invention is to provide a self-tapping screw-type masonry anchor which, when installed in a hole bored in a masonry structure to secure an object thereto, is then highly resistant to vibratory and other forces seeking to back the anchor out of the hole and thereby loosen the anchor.

More specifically, an object of this invention is to provide an anchor of the above type having a cutting thread surrounding its shank which, when the anchor is fully installed in a masonry hole, then has a diameter which is substantially uniform along the length of the thread, whereby the anchor is then highly resistant to forces which seek to back the anchor out of the hole.

Also an object of the invention is to provide an anchor of the above type whose cutting thread has a reverse taper so that the anchor encounters relatively little resistance as it is being turned into a masonry hole and the required entry torque is not high.

Briefly stated, these objects are attained in a self-tapping screw-type masonry anchor which when turned into a hole drilled in a masonry structure to secure an object thereto is then highly resistant to pull-out forces. The anchor is fabricated of a metal whose hardness is such that when it rubs against a masonry surface it is abraded and worn thereby. The anchor includes a head engageable by a torque-producing tool to rotate the anchor, and a shank extending therefrom provided with a root section surrounded by a helical male cutting thread whose series of convolutions have sharp crests and extend from the leading to the trailing end of the root section.

The crests have diameters greater than that of the hole which decrease progressively from the leading to the trailing end to create a reverse taper. When the anchor is rotated to cause it to enter the hole and tap its wall, the sharp crest at the leading end of the cutting thread experiences a high degree of wear and blunting, the degree of crest wear diminishing progressively toward the trailing end to effectively erase the taper and produce a male thread in the shank of substantially uniform diameter and a mating female internal thread in the wall of the hole, this relationship resulting in high resistance to loosening of the anchor.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is an elevational view of a self-tapping, screw-type anchor according to the invention in the form it takes before being installed in a masonry hole;

FIG. 2 is a top view of the anchor;

FIG. 3 shows the form the masonry anchor takes after it has been installed in the masonry hole to secure an object thereto;

FIG. 4 is a magnified view schematically illustrating the relationship between the crests of some of the convolutions of the male cutting thread on the installed anchor with the internal female thread tapped in the wall of the masonry hole; and FIG. 5 illustrates a modification of the male cutting thread.

DESCRIPTION OF INVENTION

Referring now to FIGS. 1 and 2, there is shown a self-tapping, screw-type masonry anchor in accordance with the invention in the form it takes before it is installed. FIG. 3 illustrates the anchor after it is installed in a masonry hole, the anchor undergoing wear in the course of being installed and somewhat changing its form.

The anchor is fabricated of a metal such as stainless steel which undergoes wear when it rubs against a concrete or similarly abrasive masonry surface. Steel is an alloy of iron and carbon with varying proportions of other elements such as nickel. Stainless steel, which has a high chromium content, is characterized by a high tensile strength and resistance to corrosion. Steel is classified by its carbon content, a high-carbon steel being useful for dies and cutting tools by reason of its great hardness. Other steels, depending on how they are heat treated, are less hard and therefore susceptible to greater wear by abrasion.

Essential to the invention is that the sharp crests of the cutting thread of the anchor which acts to tap the masonry hole wear down and become more or less blunt as the anchor is being turned into the hole, in the course of which the crests rub against the abrasive wall of the hole, and in doing so become reduced in diameter.

Hence the steel or other metal alloy used in fabricating the anchor must be sufficiently hard to provide a secure attachment, but not so hard as to resist blunting of the cutting crests and the resultant reduction in their diameter.

The anchor includes an enlarged head 10 having a frusto-conical shape from which extends a shank, generally designated by reference numeral 11. Head 10 has a diametrical slot 12 cut into its top adapted to receive the blade of a screwdriver or other torque-producing tool. The head, however, may take other forms appropriate to the type of tool being used to turn the anchor into the masonry hole.

Shank 11 has a short, unthreaded cylindrical upper section 13 which is integral with head 10 and has a diameter slightly smaller than the diameter of a hole 14 bored into a concrete or other masonry structure 15, as shown in FIG. 3, to receive the anchor.

The remainder of the shank is constituted by a cylindrical root section 16 whose diameter is slightly reduced with respect to upper section 13, and terminates at its leading end in a faceted, pointed tip 17 which acts to guide the leading end of the shank into the hole. In practice, the tip may be blunt or take other forms.

Surrounding root section 16 and running its full length is a helical cutting thread 18 having a series of convolutions $C_1$ to $C_6$ provided with sharp crests. The crest diameter of these convolutions is greatest at the leading end of the root section and decreases progressively so that it is smallest at the trailing end. However, the crest diameter of convolution $C_6$, which is the smallest in the series, is greater than the diameter of hole 14, so that this crest and the larger diameter crests of the other convolutions in the series all cut into and tap the wall of hole 14 when the anchor is turned into this hole.

As a consequence of the progressively smaller diameters of the cutting crests of convolutions $C_1$ to $C_6$, cutting thread 18 has a reverse taper formation. This is represented by the outwardly inclined lines $L_1$ and $L_2$ which are tangential to these crests.

The term reverse taper is used to distinguish this taper from that of a conventional wood screw in which the diameter of the thread is smallest at the tip end of the screw and greatest at the head end. And it also serves to distinguish the anchor taper from the taper of the cutting thread in the Ernst anchor in which the crest diameter is smallest at the leading end and greatest at the trailing end.

Alternatively, head 10 may be in the form shown in the Ernst patent, and the short, non-threaded upper section 13 of the shank omitted, so that the male cutting thread surrounds the shank along its full length.

Also surrounding root section 16 of the anchor is a helical guide thread 19 whose series of convolutions $G_1$ to $G_6$ lie in the successive spaces between convolutions $C_1$ to $C_2$ of cutting thread 18. Guide convolutions $G_1$ to $G_6$ are of uniform diameter along the length of root section 16, this corresponding to the diameter of upper section 13 of the shank. Guide thread 17 acts to center the anchor as it enters the masonry hole to prevent it from tilting, in which event it would not properly tap the hole. The uniform diameter of the guide thread is made evident by parallel dashed lines $L_3$ and $L_4$ tangential to the crests of guide convolutions $C_1$ to $C_6$.

As shown in FIG. 3, when the anchor is used to secure a plate 20 against the surface of the masonry structure, the shank of the anchor passes through a countersunk mounting hole 21 in the plate, and head 10 of the anchor is nested therein to hold the plate against the wall. It is essential that the anchor not be subject to loosening by vibratory forces.

In installing the anchor, it is rotated by a tool to turn into masonry hole 14 and in doing so tap the wall of this hole. The sharp crest of leading convolution $C_1$, which has the largest diameter in the series, has the longest way to go, for it must travel almost the full depth of the hole. Hence the crest of convolution $C_1$ rubs against the abrasive wall of masonry hole 14 in a longer path than does the next convolution $C_2$ in the series and is therefore subjected to more wear than convolution $C_2$, the wear blunting the sharp crest. The remaining convolutions $C_3$ to $C_6$ in the series have their crests worn down and blunted to a progressively lesser extent, so that the crest of the uppermost convolution 66 experiences little wear.

As a consequence of this selective wear, the reverse taper which cutting thread 18 possesses prior to installation, as shown in FIG. 1, is effectively erased in the course of installation, as shown in FIG. 3, for the most amount of wear is experienced by the largest diameter leading end crest $C_1$ in the series, and the least amount by the smallest diameter trailing end crest $C_6$.

In FIG. 3, the annular region W of hole 14, which has been tapped by the installed anchor, then has an internal female thread F cut therein that mates with the male cutting thread of the anchor, which in its installed state is substantially of uniform diameter and therefore parallel to the female thread. This is best seen in FIG. 4, where the female thread F mates with the male thread whose crests are increasingly blunted.

Because of this parallel relationship, the anchor is highly resistant to pull-out forces transmitted by the masonry resulting from external vibrations or other sources, for an axial pull-out force will not effect disengagement of the male thread from the female thread as in the case of tapered male and female threads.

Moreover, because the convolutions of the cutting thread diminish in crest diameter from the leading to the trailing end of root sections 16 of shank 11, the drag resistance they impose on the anchor as the large diameter crest is cutting its way into the masonry hole is not high, and it therefore does not take a high level of torque to rotate the anchor. Because of this, it is not difficult to turn the anchor fully into the hole, and the danger that the anchor will split in the course of being installed is minimized.

In practice, as shown in FIG. 5, a series of notches N, as in the Ernst patent, may be cut into the series of convolutions $C_1$ to $C_6$ of cutting thread 18, but this feature is not essential to the invention. Also, in practice, the guide thread may be omitted.

While there have been shown and described preferred embodiments of a self-tapping, screw-type masonry anchor in accordance with the invention, it will be appreciated that many changes and modifications may be made therein without, however, departing from the essential spirit thereof.

I claim:

1. A self-tapping, screw-type masonry anchor insertable in a hole having a predetermined diameter bored in a masonry structure to secure an object thereto, said anchor being fabricated of a metal whose hardness is such that when it rubs against a masonry surface it is abraded and worn thereby, said anchor comprising:
   (a) an enlarged head engageable by a torque-producing tool to rotate the anchor; and
   (b) a shank integral with the head and extending therefrom, said shank including a root section having a leading end and a trailing end, and a helical cutting thread surrounding the root section formed by a series of convolutions having sharp crests running from the leading to the trailing end, said crests having diameters greater than that of the hole and decreasing progressively from the leading to the trailing end to create a reverse taper, whereby when the tool acts to rotate the anchor to cause the cutting thread to tap its way into the wall of the hole, the sharp crests of the cutting thread then experience a degree of wear and blunting that diminishes progressively from the leading end toward the trailing end to effectively erase the reverse taper to create on the shank a male thread whose crests are of substantially uniform diameter and to create on the wall of the hole a complementary internal female thread resulting in high resistance to loosening of the anchor.

2. A masonry anchor as set forth in claim 1, in which the anchor is made of stainless steel.

3. A masonry anchor as set forth in claim 1, in which said shank includes a non-threaded cylindrical upper section interposed between the root section and the head.

4. A masonry anchor as set forth in claim 1, wherein the leading end of the root section terminates in a tip.

5. A masonry anchor as set forth in claim 1, wherein said head has a frusto-conical shape and a slot in its top to receive the blade of a screwdriver.

6. A masonry anchor as set forth in claim 1, further including a guide thread surrounding the root section having a series of convolutions of uniform diameter lying in the successive spaces between the convolutions of the cutting thread, the diameter of said guide thread convolutions being slightly smaller than the diameter of the hole.

7. A masonry anchor as set forth in claim 1, wherein said male thread has a series of notches cut therein, one in each convolution.

8. A masonry anchor as set forth in claim 1, in which the masonry structure is formed of concrete and said object is provided with a mounting hole to pass the shank of the anchor and to retain the head thereof.

9. A self-tapping, screw-type masonry anchor insertable in a hole bored in a masonry structure to secure an object thereto, said anchor being fabricated of a metal whose hardness is such that when it rubs against a masonry surface it is abraded and worn thereby, said anchor comprising a head engageable by a tool to rotate the anchor and a shank extending from the head provided with an external cutting thread formed by a series of convolutions having sharp crests whose diameters decrease progressively to define with respect to the head a reverse taper, whereby when the tool acts to rotate the anchor to cause the cutting thread to tap its way into the wall of the hole, the sharp crests then experience respective degrees of wear and blunting that effectively erase the reverse taper to create on the shank an external male thread whose crests are of substantially uniform diameter and to create on the wall of the hole a complementary internal female thread resulting in high resistance to loosening of the anchor.

10. A single-piece, self-tapping, screw-type masonry anchor insertable in a hole bored in a substrate to secure an object thereto, said anchor being fabricated of a material which, when it rubs against a surface of the substrate is abraded and worn thereby, said anchor comprising a head engageable by a tool to rotate the anchor and a shank extending from the head provided with an external cutting thread formed by a series of convolutions having crests whose diameters decrease progressively to define with respect to the head a reverse taper, whereby when the tool acts to rotate the anchor to cause the cutting thread to tap its way into the wall of the hole, the crests then experience respective degrees of wear to create on the shank an external male thread whose crests are of substantially uniform diameter and to create on the wall of the hole a complementary internal female thread resulting in high resistance to loosening of the anchor.

* * * * *